United States Patent
Metzger et al.

(10) Patent No.: US 7,774,764 B2
(45) Date of Patent: Aug. 10, 2010

(54) METHOD AND SYSTEM FOR EFFICIENT RANGE AND STRIDE CHECKING

(75) Inventors: Markus T. Metzger, Neu-Ulm (DE); Robert Wiesner, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1266 days.

(21) Appl. No.: 11/314,225

(22) Filed: Dec. 21, 2005

(65) Prior Publication Data

US 2007/0143746 A1    Jun. 21, 2007

(51) Int. Cl.
    *G06F 9/45*    (2006.01)
(52) U.S. Cl. .................. 717/143; 717/140; 717/141; 717/151; 717/153; 717/154
(58) Field of Classification Search .......... 717/140–161
    See application file for complete search history.

(56) References Cited

U.S. PATENT DOCUMENTS

| | | | |
|---|---|---|---|
| 5,339,420 A * | 8/1994 | Hoxey ........................ 717/151 |
| 5,548,761 A * | 8/1996 | Balasundaram et al. ...... 717/159 |
| 6,412,105 B1 * | 6/2002 | Maslennikov et al. ........ 717/151 |
| 2003/0204839 A1 * | 10/2003 | Kawahito et al. ............ 717/130 |
| 2004/0210886 A1 * | 10/2004 | Jarp et al. .................... 717/159 |
| 2004/0250231 A1 * | 12/2004 | Killian et al. ................. 716/18 |
| 2006/0248520 A1 * | 11/2006 | Kawabata et al. ............ 717/160 |

\* cited by examiner

*Primary Examiner*—Wei Y Zhen
*Assistant Examiner*—Matthew J Brophy
(74) *Attorney, Agent, or Firm*—Blakely, Sokoloff, Taylor & Zafman LLP

(57) ABSTRACT

Embodiments of a method and system for compiling code, such as program-generated code, are disclosed herein. The method and system efficiently encode combined range and stride checks. For example, the method and system are operable to encode combined range and stride checks as they occur in a translation of switch statements. The method and system can generate code to perform the range and stride check, and to branch to the case body, if the range and stride checks are successful. The various embodiments may operate to provide an efficient code transformation, better code density, and processing performance. Other embodiments are described and claimed.

17 Claims, 3 Drawing Sheets

METHOD AND SYSTEM FOR EFFICIENT RANGE AND STRIDE CHECKING

BACKGROUND OF THE DISCLOSURE

Source code is typically written by a programmer in a language that attempts to describe a solution to a problem. A compiler is used to process and convert source code to object code that a computer understands. Generally, the compiler reads the source code and builds object code as a collection of binary number instructions. Instruction selection is one of the main tasks of optimizing compilers. Instruction selection can be as simple as selecting a single instruction to encode a single operation. Moreover, instruction selection can be as complex as selecting a pre-defined assembly-level algorithm to encode a recognized source-level algorithm.

Switch statements are one of the main building blocks for implementing state transition automata. An end user typically writes a description of an automaton. The actual code (e.g. "C", "C++", etc.) for the automation can be generated by a program generator for example. The generated code typically shows a certain structure and often lacks the elegance of the end user's written code. An example of user-written code including a switch statement having a number of case labels is shown below.

```
extern void
dispatch(int x, enum e_tag tag) {
    switch (tag) {
        case e_1:
            process_1(x);
            break;
        case e_3:
            process_3(x);
            break;
        case e_5:
            process_5(x);
            break;
        case e_7:
            process_7(x);
            break;
        case e_9:
            process_9(x);
            break;
    }
}
```

Conventional encoding techniques are not proficient at recognizing distances between values (herein referred to as "strides") when encoding switch statements and other code. A conventional technique that does not recognize stride values generates an s-times (where "s" is the stride length) bigger branch table filling the gaps with branches to the default block (usually done for stride length=2). A conventional encoding technique for encoding the switch statement above is shown below.

```
ldr r3, #branch_table
sub r2, r1, #1
cmp r2, #8
bhi L1.default
ldr r3, [r3, r2]
add pc, pc, r3
```

The resulting branch_table:
.word L1.process_1
.word L1.default
.word L1.process_3
.word L1.default
.word L1.process_5
.word L1.default
.word L1.process_7
.word L1.default
.word L1.process_9

As shown above, the branch table uses "default" to fill in gaps between stride values. This is expensive and inefficient. Correspondingly, the conventional encoding technique shown above is not efficient at encoding the range and stride check for a given range m, m+s, m+2s, . . . , m+ns, where "m" is the minimum start value of the range, "s" is the stride length (constant distance between values) of a stride, and "n" is the number of strides. Typically, three tests are required to determine whether a variable (e.g. "x") is inside a range. The three tests are:

$$x >= m \tag{1}$$

$$x <= m+ns \tag{2}$$

$$x = m (\bmod s) \tag{3}$$

As seen above, the conventional encoding technique requires at least three compares and, more significantly, three conditional branches. The three conditional branches use up precious space in the branch target buffer. Additionally, the conditional branches are subject to misprediction which can result in a potentially expensive range check. Branch misprediction occurs when a computing system mispredicts the next instruction to process in branch prediction. Branch prediction is important since delivering high branch-prediction rates advances performance gains in high-performance computing.

DETAILED DESCRIPTION

Embodiments of a method and system for compiling code, such as program-generated code, are disclosed herein. The method and system efficiently encode combined range and stride checks. For example, the method and system can encode combined range and stride checks as they occur in a translation of switch statements. The method and system are operable to analyze case labels in switch statements and recognize stride s case ranges, i.e. m, m+s, m+2s, . . . , m+ns (where "m" is a minimum start value of the range, "n" is the number of strides, and "s" is the stride length).

The method and system can generate code to perform the range and stride check, and to branch to a specified destination or code, if the range and stride checks are successful, but is not so limited. While an efficient translation of switch statements is discussed herein, the method and system applies to other encoding techniques and should not be limited to any specific embodiments or examples discussed herein. For example, the method and system operate to encode if-then-else and other code. The various embodiments may operate to provide an efficient code transformation, better code density and processing performance.

According to an embodiment, a method for compiling generated code examines a range of values. The range of values includes a lower range value and an upper range value.

The method determines a stride of the range and if a test value is in stride. The method also transforms the range, and if the test value is in stride, the method determines whether the test value is within the transformed range of values. If the test value is in stride and within the transformed range of values an action is performed.

In the following description, numerous specific details are introduced to provide a thorough understanding of, and enabling description for, embodiments of operations using a compiler to generate machine-readable code. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
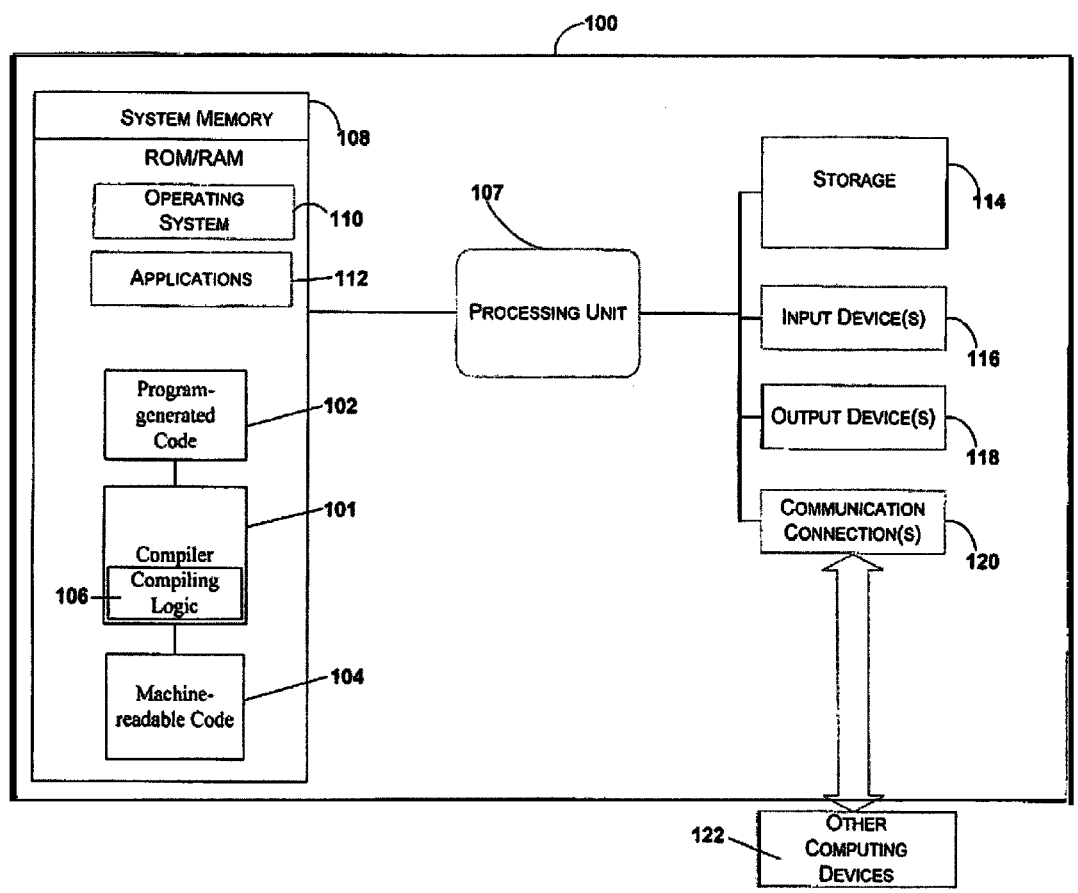
FIG. 1 is a block diagram of a computing device including a compiler for efficiently encoding combined range and stride checks, according to an embodiment.

FIG. 1 illustrates a computing device 100 including a compiler 101 that operates to efficiently encode user or program-generated code 102 to machine-readable code 104 via computing logic 106 according to an embodiment. The computing device 100 includes any computing system, such as a hand-held, mobile computing system, a desktop computing system, laptop computing system, graphics-specific computing system, and other computing systems. The computing device 100 typically includes at least one processing unit 107 and system memory 108. Depending on the configuration and type of computing device, system memory 108 may be volatile (such as random-access memory (RAM) or other dynamic storage), non-volatile (such as read-only memory (ROM), flash memory, etc.) or some combination. The computing device 100 can include multiple processors and other devices.

The system memory 108 can include an operating system 110, and one or more applications 112. As described above, the system memory 108 can also include a compiler 101 and compiling logic 106, according to an embodiment. Computing device 100 may include additional computer storage 114, such as magnetic storage devices, optical storage devices, etc. Computer storage includes, but is not limited to, RAM, ROM, electrically erasable programmable read-only memory (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store information.

Computing device 100 may also include one or more input devices 116, such as keyboard, mouse, pen, audio input, tactile input device, etc., and one or more output devices 118, such as a display, speakers, printer, etc. Computing device 100 may also contain communication connections 120 that allow the computing device 100 to communicate with other computing devices 122 and systems, such as over a wireline and/or wireless network or other network.

As shown in FIG. 1, the computing device 100 includes a compiler 101 that operates to efficiently encode user or program-generated code 102 to machine-readable code 104. According to an embodiment, the compiler 101 includes compiling logic 106 which operates to encode combined range and stride checks. A stride is the distance between two values, but is not so limited. For example, the stride between values 10 and 14 is 4. A constant stride means that the difference between two values in a sorted list is constant. A range may include multiple different strides and is not limited to any specific example described herein. For example, assume the values: 10, 18, and 14. The values can be sorted as 10, 14, 18. Since 14−10=4 and 18−14=4, the constant stride is 4. A range includes any number of values which may or may not include missing values (i.e. gaps). A range typically includes a lower value and an upper value.

Embodiments of the compiling logic 106 can operate to encode combined range and stride checks as they occur in an efficient translation of switch statements. The compiling logic 106 operates to perform combined range and stride checks without the use of branch instructions. Generally, the case bodies for each of the case range labels are held in a branch table and the compiler 101 generates, after generating the range and stride check, a computed goto indexed by the branch table contents.

According to an embodiment, the compiling logic 106 of the compiler 101 operates to analyze case labels in switch statements. A switch statement is typically used to jump to a place/location within a controlled statement, depending on the result of an expression, such as an integer expression. A case label serves as a target within an associated switch statement. Based on the analysis of the case labels, the compiling logic 106 recognizes stride s case ranges (e.g. m, m+s, m+2s, . . . , m+ns; where "m" represents a minimum start value, "s" represents the stride length, and "n" represents the number of strides), i.e. whether a value is in stride and within a range of values. As described below, the compiler 101 can generate code to perform the range and stride check, and to branch to a specified destination, such as a case body for example, if the range and stride checks pass. The compiler 101 and compiling logic 106 can be used to encode other generated code and is not intended to be limited to any specific embodiments and examples described herein.

As described above, at least three tests are typically required to check whether a variable x is inside a range:

$$x >= m \tag{1}$$

$$x <= m+ns, \text{ and} \tag{2}$$

$$x = m (\bmod s). \tag{3}$$

According to an embodiment, the compiling logic 106 uses three assembly instructions to implement the above three checks by combining the x>=m && x<=m+ns to (x−m)<=ns (where && represents logical AND). Additionally, the compiling logic 106 requires no branches to implement the above three checks which frees up the target buffer. Freeing up the target buffer allows for faster processing. Additionally, freeing up the target buffer allows for other operations, if required. In an embodiment, the compiling logic 106 assumes that all constants involved are small enough to be encoded in the immediate field of the respective instruction.

First, let m+ns=u.

Then the stride and range check for a case range (m, m+s, . . . , m+ns) can be encoded by the compiling logic 106 as:

sub r2, r1, #u+s; (where r1 is the to be tested value)
tst r2, #s−1; (stride check)
cmneq r2, #u+s−1; (range check)

Before continuing with the description, it is useful to note that a processor typically includes a number of processing registers, including a current program status register (CPSR). The CPSR typically contains a set of condition code flags in a number of upper bits, (e.g. four upper bits) that record the result of a previous instruction. Some instructions (e.g. logical operations, arithmetic operations, shifting operations, etc.) change these flags to mark certain results such as: Zero, Positive, Carry, Overflow, signed Overflow, etc.

Accordingly, the above-encoded stride and range check ensures that the Carry flag of the CPSR is set if r1 is inside the case range, otherwise the Carry flag is clear (i.e. not set).

More particularly, the tst instruction operates to clear the Carry flag. The compiling logic 106 ensures that the Carry flag remains unchanged at the tst instruction (by encoding the immediate #s−1 in the imm__8 field for example). The compiling logic 106 clears the Carry flag such that the immediate #s−1 is constructed by right rotating #((s−1)<<2) by 2. If s=1, the stride check (tst r2, #s−1) can be omitted.

After the range and stride check, the compiling logic 106 can branch to a specified destination, such as a case body. For example, compiling logic 106 can branch to the case body with a bcs case_body instruction. As another example, after the range and stride check, the compiling logic 106 can encode the case body inline predicated on when the Carry flag is set (i.e. load the case destination address). The compiling logic 106 can also branch away from the case range to test for the next case or cases of the switch statement. The compiling logic 106 can branch away from the case range using bcc not_in_case_range for example.

According to an embodiment, and as shown below, a branch table can be encoded inline predicated on setting the Carry flag. Thus, the complete code for a stride $s=2^k$ between lower bound m and upper bound u is as follows, but is not so limited:

ldr r3, #branch_table
   sub r2, r1, #u+s
   tst r2, #s−1
   cmneq r2, #u+s−1
   ldrcs r3, [r3, r2, lsl #2−k]
   addcs pc, pc, r3

For 4-byte branch table entries, and k<2, the logical shift left (lsl) becomes a logical shift right (lsr). For k=2, scaling can be omitted. For smaller entries, the scaling is adjusted and the loaded entry can be scaled in the computed goto (addcs pc, pc, r3, lsl #factor). The branch table entry size can vary, e.g. 1, 2 bytes, etc. Correspondingly, for a 1-byte branch table entry size the #2−k expression becomes "lsr k", 2-byte branch table entry size the #2−k expression becomes "lsl 1−k".

The example of user-written code 102 including a switch statement is shown below to illustrate use of the compiling logic 106 to encode the user-written code 102, according to an embodiment.

The user-written code is:

```
extern void
dispatch(int x, enum e_tag tag) {
    switch (tag) {
        case e__1:
            process__1(x);
            break;
```

```
        case e__3:
            process__3(x);
            break;
        case e__5:
            process__5(x);
            break;
        case e__7:
            process__7(x);
            break;
        case e__9:
            process__9(x);
            break;
    }
```

The machine-readable code 104 resulting from compiling logic 106 is:

ldr r3, #branch_table
   sub r2, r1, #11
   tst r2, #1
   cmneq r2, #10
   ldrcs r3, [r3, r2, lsr #1]
   addcs pc, pc, r3

The resulting branch_table:
   .word L1.process__1
   .word L1.process__3
   .word L1.process__5
   .word L1.process__7
   .word L1.process__9

Compared to the conventional encoding technique shown above, the compiling logic 106 results in saving about half the branch table, while adding one additional instruction to implement the stride check. Moreover, as shown above, the compiling logic 106 eliminates one of the three test conditions. Additionally, the compiling logic 106 allows the logical AND of the remaining checks to be computed inside the CPSR. That is, by transforming the range, the compiling logic 106 operates to reduce the 3 test conditions to two test conditions. Two conditions can then be tested. The compiling logic 106 can check one condition using a flag (e.g. the Zero flag for example) to determine if the test value is in stride (i.e. matches a possible stride value). Then, if the Zero flag is set based on the modulo operation, the compiling logic 106 checks the upper upper value and sets another flag (the Carry flag for example) if this test is satisfied. Thus, the Carry flag is only set if the test value is in stride and within the proper range.

The table below illustrates an example and provides an explanation of the determination of whether a test value (VAL) is in a range from 10 to 18 (inclusive) having a stride length or value of 2. Thus, the range is 10, 12, 14, 16, and 18.

| dispatch: | Load the table base address | R3: jump table base address |
|---|---|---|
| ldr r3, #branch_table | | R1: the value to be tested |
| sub r2, r1, #20 | Subtract the upper boundary plus one stride from the lower and upper range values and from VAL. VAL = VAL − 20 (NOTE: the range −10 to −2 is equivalent with 4294967286 to 4294967294, since only changing SIGN to UNSIGN interpretation.) | R2 = R1 − 20 |
| tst r2, #1 | STRIDE TEST: Test for stride (R2 % 2) == 0 is the same as (R2 & 1), which is performed by the TST instruction (where #1 = Stride −1, and the Stride is 2 fir this example). | ZERO flag = (R2 & (stride − 1)) CARRY flag == 0 if FLAG == 0 which means on a possible stride value, check the range by checking if the value is larger than 4294967286. If so, the |

-continued

| | | |
|---|---|---|
| | ZERO FLAG = VAL & (2 − 1) (this also clears the CARRY FLAG) (NOTE: this is unaffected by sign or un-sign and MODULO Division (%) by $2^n$ is equivalent to an AND operation if the value is a ($2^n$ − 1)), but not so limited | CARRY flag is set (TRUE), if FLAG != 0, do nothing |
| cmneq r2, #10 | RANGE CHECK: If R2 & 1 == 0 this code will be executed, otherwise not. Check if R2 >= −10 If R2 < −10, clear CARRY Flag If R2 >= −10, set CARRY flag | −10 is the same as 4294967286 and interpreted as unsigned |
| ldrcs r3, [r3, −r2, lsr #1] | Execute the following two instructions only if the CARRY flag is set, the carry flag only is set, if R2&1 == 0 and R2 >= −10, which is the same as R1 is element of {10, 12, 14, 16, 18} This code is executed on a hit. | |
| addcs pc, pc, r3 | Branch to the case or fall through to the default case. | |

@ fall through default case
branch_table:
.word L1.process__9
.word L1.process__7
.word L1.process__5
.word L1.process__3
.word L1.process__1

According to an embodiment, the compiling logic 106 can encode the above user-written code as the following:
    ldr r3, #branch_table
    sub r2, r1, #1
    tst r2, #1
    bne L1.default
    cmp r2, #8
    bhi L1.default
    ldr r3, [r3, r2, lsr #1]
    add pc, pc, r3
The resulting branch_table:
    .word L1.process__1
    .word L1.process__3
    .word L1.process__5
    .word L1.process__7
    .word L1.process__9

Figure 2:
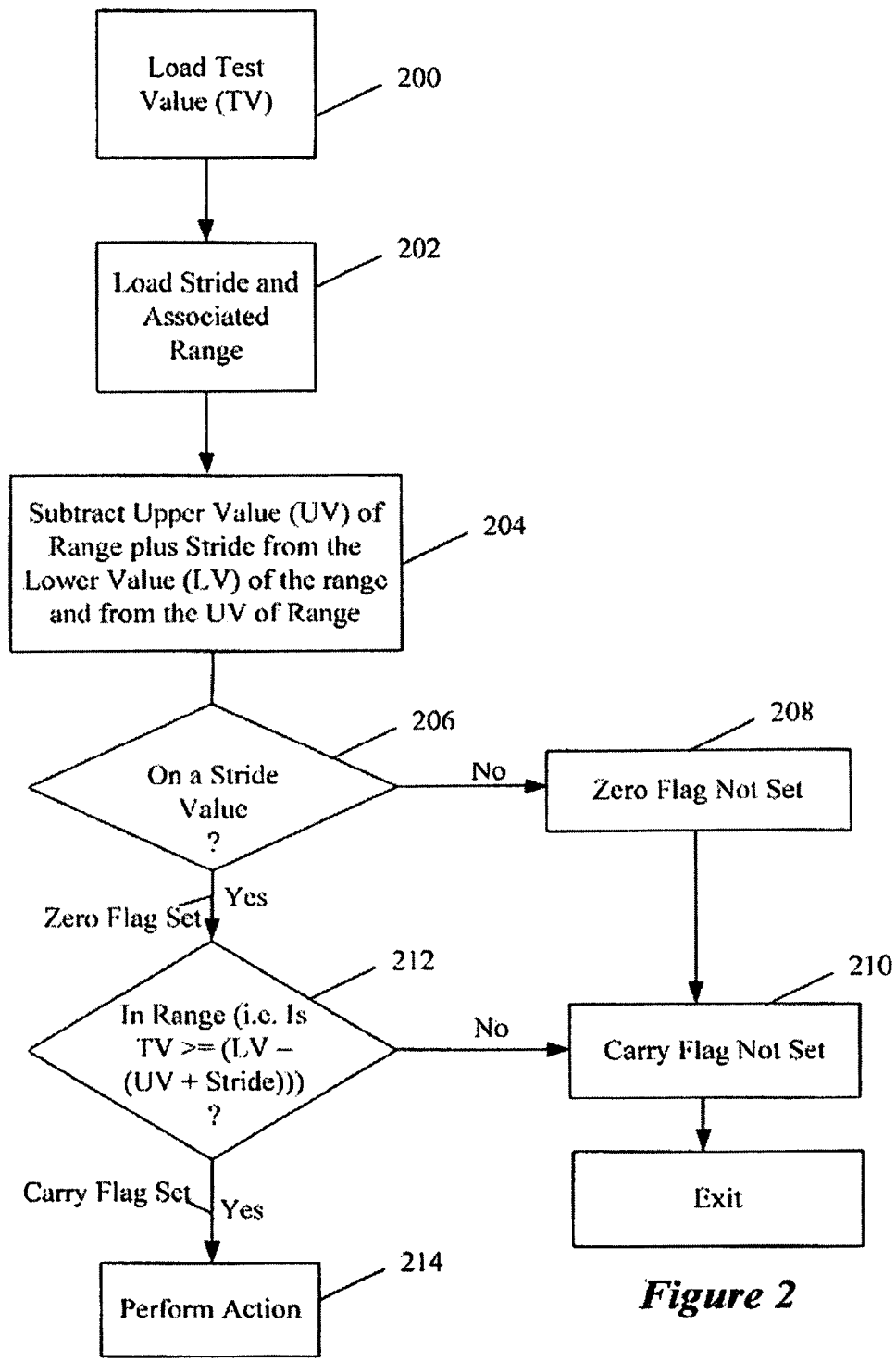
FIG. 2 is a flow diagram illustrating a stride and range check, according to an embodiment.

FIG. 2 is a flow diagram illustrating a combined stride and range check, according to an embodiment. The combined stride and range check can be implemented in a compiler, such as compiler 101 of FIG. 1. At 200, a test value is loaded by the compiler 101. At 202, the compiler 101 loads the stride and range values associated with the test value. The stride value can be determined by examining a range of values looking for a constant distance between values, but is not so limited. A range includes an upper value and a lower value. There may be multiple ranges and multiple strides. At 204, the compiler 101 transforms the range by subtracting the upper value of the range plus the stride value from the lower value of the range, and by subtracting the upper value of the range plus the stride value from the upper value of the range. The compiler 101 also subtracts the upper value of the range plus the stride value from the test value. At 206, the compiler 101 determines if the test value matches the stride value.

If the test value does not match the stride value, the flow proceeds to 208 (i.e. the Zero flag is not set), and then to 210 (i.e. the Carry flag is not set), before exiting the flow. If the test value matches the stride value, the Zero flag is set and the flow proceeds to 212. At 212, the compiler 101 determines if the test value is within the transformed range by testing if the test value is greater than or equal to the lower value minus the upper value plus the stride value. If the test value is within the transformed range, the Carry flag is set. At 214, the compiler 101 performs an action if the combined stride and range check is successful. If the test value is not within the transformed range, the flow proceeds to 210 (i.e. the Carry flag is not set) and exits.

Figure 3:
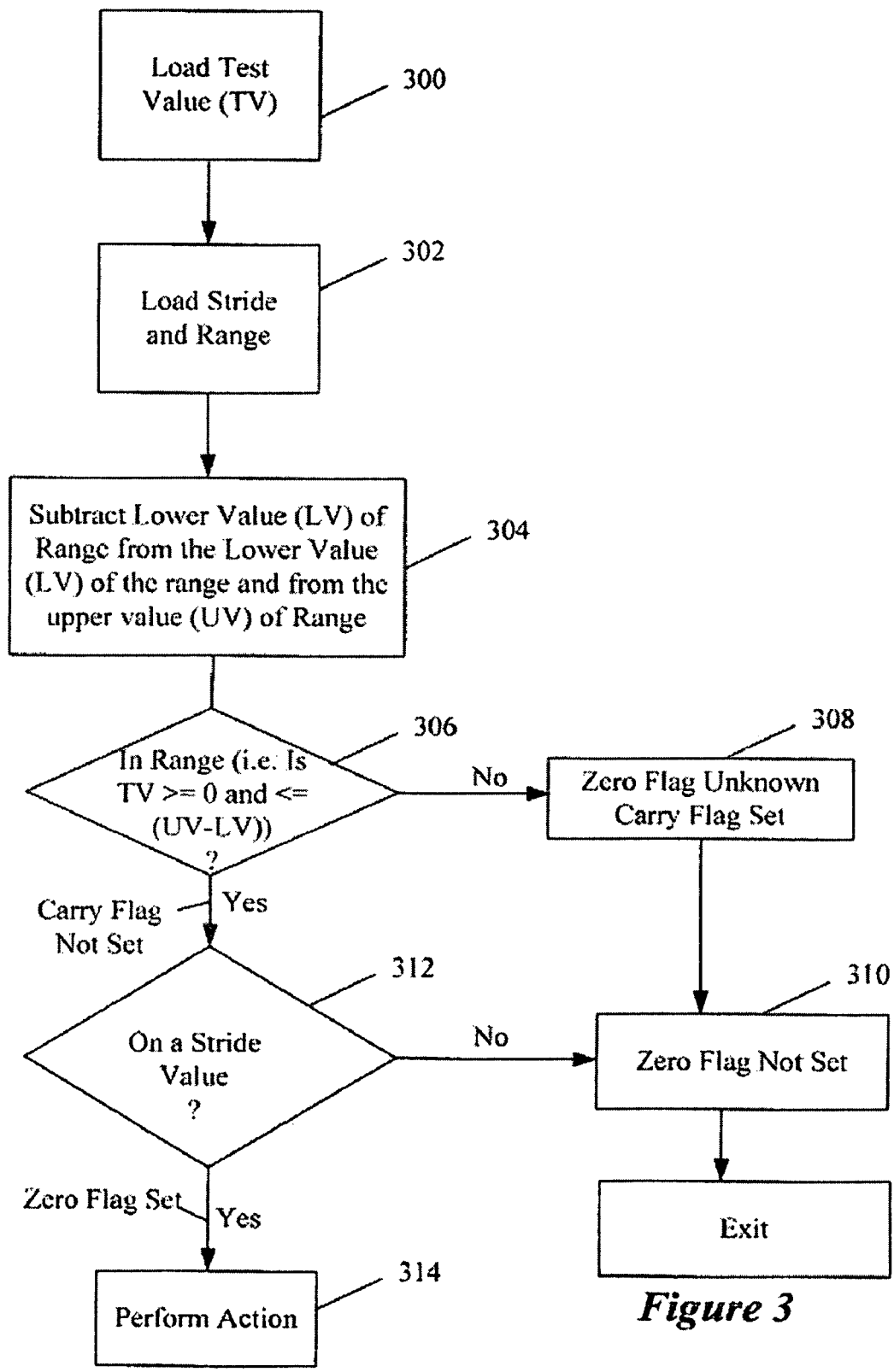
FIG. 3 is a flow diagram illustrating a stride and range check, according to an embodiment.

FIG. 3 is a flow diagram illustrating a combined range and stride check, according to an embodiment. The combined range and stride check can be implemented in a compiler, such as compiler 101 of FIG. 1. At 300, a test value is loaded by the compiler 101. At 302, the compiler 101 loads the stride and range values associated with the test value. The range includes an upper value and a lower value. At 304, the compiler 101 transforms the range by subtracting the lower value of the range from the lower value of the range, and by subtracting the lower value of the range from the upper value of the range. The compiler 101 also subtracts the lower value of the range from the test value. At 306, the compiler 101 determines if the test value is in the transformed range (i.e. greater than or equal to zero and less than or equal to the upper value minus the lower value).

If the test value is not in the transformed range, the flow proceeds to 308 (i.e. the Zero flag is unknown and the Carry flag is set), and then to 310 (i.e. the Zero Flag is not set), before exiting the flow. If the test value is within the transformed range (i.e. the Carry flag is not set), the flow proceeds to 312. At 312, the compiler 101 determines if the test value matches a stride value. If the test value matches a stride value, the Zero flag is set. At 314, the compiler 101 performs an action associated with the test value. If the test value does not match a stride value, the Zero flag is not set at 310 and the flow exits.

The following provide range transformation examples when generating a switch statement such as:

```
switch (tag) {
    case b + 0*n: ...
    case b + 1*n: ...
    ....
    case b + s*n: ...
}
```

Example 1

The range is b to b + (s*n); where s = stride value, tag = test value, n = scalar number, $M = 2^N$, N == max bits/scalar (e.g. 16, 32 or 64)).

| | | |
|---|---|---|
| b − (s + 1)*n | b + s*n − n | b <= tag <= b + s*n && ((tag − b) % n) == 0, this can be transformed to −(s + 1)*n <= tag − b − (s + 1)*n <= −n && ((tag − b) % n) == 0 |
| M − (s + 1)*n | M − n | This can be transformed further to M − (s + 1)*n <= M + tag − b − (s + 1)*n <= M − n && ((tag − b) % n) == 0 |
| M − (s + 1)*n | M − 1 | Which is equivalent to ((tag − b) % n) == 0 && M − (s + 1)*n <= M + tag − b − (s + 1)*n |

Note:
&& represents logical AND; % represents modulo; and == represents identical to.

As shown in Example 1, and described above, the compiling logic 106 eliminates one of the above three test conditions by transforming the case range to the uppermost end of the ring modulo (e.g. $2^{32}$).

Example 2

| | | |
|---|---|---|
| | | n == 1 |
| b | b + s*n | b <= tag <= b + s*n, this can be transformed to 0 <= tag − b <= s*n |
| 0 | s*n | tag − b <= s*n |

The aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Embodiment may also be implemented as microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in machine-readable medium, other aspects may likewise be embodied in machine-readable medium. Accordingly, the inventors reserve the right to add additional claims after filing the application to pursue such additional claim forms for other aspects as well.

What is claimed is:

1. A method for compiling generated code comprising: examining a range of values, wherein the range of values includes a lower range value and an upper range value;
   determining a stride of the range of values, wherein the stride is a distance between two values in the range of values, by examining a flag of a status register, wherein setting of the flag corresponds to a result of a modulo operation between the test value and the stride;

transforming the range of values; determining whether a test value is in stride; if the test value is in stride, determining whether the test value is within the transformed range of values; and performing an action if the test value is in stride and within the transformed range of values.

2. The method of claim 1, further comprising analyzing case values to determine if the test value is in stride and within the transformed range of values.

3. The method of claim 1, further comprising branching to a case body if the test value is in stride and within the transformed range of values.

4. The method of claim 1, further comprising transforming the range of values by: subtracting the upper range value plus the stride from the lower range value; and subtracting the upper range value plus the stride from the upper range value.

5. The method of claim 1, further comprising determining whether the test value is in the transformed range of values by examining a flag of a status register, wherein the setting of the flag corresponds to a determination as to whether the test value is greater than or equal to a difference of the upper range value plus the stride, and the lower range value.

6. The method of claim 1, further comprising clearing a separate flag during the stride determination.

7. The method of claim 1, further comprising encoding inline predicated on the test value being with the transformed range of values.

8. A computer-storage medium having stored thereon instructions, which when executed in a system operate to encode generated code by:

examining a range of values, wherein the range of values includes a lower range value and an upper range value;

determining a stride of the range of values, wherein the stride is a distance between two values in the range of values, by examining a flag of a status register, wherein setting of the flag corresponds to a result of a modulo operation between the test value and the stride;

transforming the range of values;

determining whether a test value is in stride;

if the test value is in stride, determining whether the test value is within the transformed range of values; and performing an action if the test value is in stride and within the transformed range of values.

9. The medium of claim 8, wherein the instructions, when executed operate to transform the range of values by: subtracting the upper range value plus the stride from the lower range value; and subtracting the upper range value plus the stride from the upper range value.

10. The medium of claim 8, wherein the instructions, when executed further comprise branching to a destination if the test value is in stride and within the transformed range of values.

11. The medium of claim 8, wherein the instructions, when executed further comprise analyzing case values to determine if the test value is in stride and within the transformed range of values.

12. The medium of claim 8, wherein the instructions, when executed operate to determine whether the test value is in the transformed range of values by examining a flag of a status register, wherein the setting of the flag corresponds to a determination as to whether the test value is greater than or equal to a difference of the upper range value plus the stride, and the lower range value.

13. The medium of claim 8, wherein the instructions, when executed further comprise encoding inline predicated on the test value being with the transformed range of values.

14. A system comprising:

a processor;

a compiler recorded on a computer-storage medium for encoding generated code to machine-readable code, and operable to, examine a range of values, wherein the range of values includes a lower range value and an upper range value; determine a stride of the range of values, wherein the stride is a distance between two values in the range of values, by examining a flag of a status register, wherein setting of the flag corresponds to a result of a modulo operation between the test value and the stride;

transform the range of values;

determine whether a test value is in stride; if the test value is in stride, to determine whether the test value is within the transformed range of values; and perform an action if the test value is in stride and within the transformed range of values.

15. The system of claim 14, the compiler operable to transform the range of values including operability to subtract the upper range value plus the stride from the lower range value, and subtract the upper range value plus the stride from the upper range value.

16. The system of claim 14, the compiler operable to branch to a destination if the test value is in stride and within the transformed range of values.

17. The system of claim 14, further comprising a status register and the compiler is operable to examine a flag of the status register to determine if the flag is set based on whether the test value is greater than or equal to a difference of the upper range value plus the stride, and the lower range value.

* * * * *